(12) United States Patent
Onishi et al.

(10) Patent No.: US 11,970,220 B2
(45) Date of Patent: Apr. 30, 2024

(54) ELECTRIC POWER STEERING APPARATUS (71) Applicant: Mitsubishi Electric Corporation, Tokyo (JP)

(72) Inventors: Yoshihiko Onishi, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 824 days.

(21) Appl. No.: 17/049,464

(22) PCT Filed: May 22, 2018

(86) PCT No.: PCT/JP2018/019585
§ 371 (c)(1),
(2) Date: Oct. 21, 2020

(87) PCT Pub. No.: WO2019/224899
PCT Pub. Date: Nov. 28, 2019

(65) Prior Publication Data
US 2021/0237794 A1    Aug. 5, 2021

(51) Int. Cl.
*B62D 5/04* (2006.01)
*B62D 3/12* (2006.01)

(52) U.S. Cl.
CPC .......... *B62D 5/0406* (2013.01); *B62D 3/126* (2013.01); *B62D 5/0424* (2013.01)

(58) Field of Classification Search
CPC ........ H02K 5/10; B62D 5/0406; B62D 3/126; B62D 5/0424; B62D 5/04; B62D 5/0403; B62D 5/0442; B62D 5/0421

USPC .............. 174/17 VA, 50, 520; 180/443, 444; 310/10

See application file for complete search history.

(56) References Cited

U.S. PATENT DOCUMENTS

| | | | | |
|---|---|---|---|---|
| 4,721,175 A | * | 1/1988 | Butler | B62D 5/22 180/428 |
| 9,168,947 B2 | | 10/2015 | Shiino et al. | |
| 9,831,748 B2 | * | 11/2017 | Hayashi | H02K 3/50 |
| 10,668,942 B2 | * | 6/2020 | Rey | B62D 5/0421 |

(Continued)

FOREIGN PATENT DOCUMENTS

| | | |
|---|---|---|
| CN | 107416013 A | 12/2017 |
| EP | 3225509 A1 | 10/2017 |

(Continued)

OTHER PUBLICATIONS

Office Action dated Apr. 14, 2022 in Chinese Application No. 201880093385.7.

(Continued)

*Primary Examiner* — Angel R Estrada
(74) *Attorney, Agent, or Firm* — Sughrue Mion, PLLC; Richard C' Turner (57) ABSTRACT

There is provided an electric power steering apparatus in which a motor housing that contains motor constituent members and has a waterproofing function and a control unit case that contains control apparatus constituent members and has a waterproofing function are provided, in which an output axle of a motor extends to the outside of the motor housing while maintaining the waterproofing function, and in which a respiratory apparatus that performs a respiratory action, based on an inner pressure change, is provided in the motor housing.

20 Claims, 6 Drawing Sheets

(56) References Cited

U.S. PATENT DOCUMENTS

| | | | |
|---|---|---|---|
| 10,826,355 B2* | 11/2020 | Kanazawa | B62D 5/0406 |
| 11,407,444 B2* | 8/2022 | Knopp | B62D 7/16 |
| 11,606,000 B2* | 3/2023 | Hamada | B62D 5/0424 |
| 2005/0115727 A1 | 6/2005 | Sakata | |
| 2017/0282965 A1 | 10/2017 | Sekikawa | |
| 2018/0006521 A1 | 1/2018 | Fujimoto | |
| 2019/0199176 A1 | 6/2019 | Kanazawa et al. | |

FOREIGN PATENT DOCUMENTS

| | | |
|---|---|---|
| JP | 2002-079950 A | 3/2002 |
| JP | 2005-132165 A | 5/2005 |
| JP | 2008-184043 A | 8/2008 |
| JP | 2009-184492 A | 8/2009 |
| JP | 2017-177996 A | 10/2017 |
| WO | 2016/125700 A1 | 8/2016 |
| WO | 2018/042989 A1 | 3/2018 |

OTHER PUBLICATIONS

Communication dated Aug. 3, 2021 from the Japanese Patent Office in Application No. 2020-520893.
Extended European Search Report dated Apr. 29, 2021 from the European Patent Office in Application No. 18919771.8.
Communication dated Jun. 2, 2021 from the Indian Intellectual Property Office in Application No. 202027040891.
International Search Report for PCT/JP2018/019585 dated Aug. 28, 2018 (PCT/ISA/210).
Communication dated Jan. 3, 2024, issued in Indian Application No. 202027040891.

* cited by examiner

ELECTRIC POWER STEERING APPARATUS

CROSS REFERENCE TO RELATED APPLICATIONS

This application is a National Stage of International Application No. PCT/JP2018/019585 filed May 22, 2018.

DESCRIPTION

Technical Field

The present disclosure relates to an electric power steering apparatus in which a motor and a control unit are integrated with each other.

Background Art

As is well known, an electric power steering apparatus is configured in such a way that auxiliary torque corresponding to steering torque exerted on a steering shaft by a driver of a vehicle is generated by a motor so that steering by the driver is assisted; however, in an electric power steering apparatus in which a motor and a control unit for controlling the motor are integrated with each other, in consideration of a case where the electric power steering apparatus is installed in the vicinity of a rack axel outside the vehicle interior, there are required not only waterproofing measures for the motor itself and the control unit itself but also waterproofing measures for the coupling portion between the motor and the control unit. To date, as waterproofing measures for the coupling portion between the motor and the control unit, there have been taken measures in which, for example, a seal is applied to or an O-ring is mounted on the coupling portion.

In an electric power steering apparatus disclosed in Patent Document 1, a motor and a control unit are integrated with each other and, as waterproofing measures for the space between the power steering apparatus and a gear housing that are provided at the vehicle side, there is adopted a structure in which a ring-shaped sealing member passing through the outside of an electric connection portion of the motor is mounted between the motor and a motor mounting portion of the gear housing. The conventional electric power steering apparatus disclosed in Patent Document 1 make it possible to secure the waterproof property and the dust resistance in the connection portion between the motor and the gear housing and to secure the waterproof property also in the electric connection portion of the motor.

Meanwhile, in the case of an electric power steering apparatus having a watertight structure in which a motor and a control unit are completely waterproof, when due to heat generation in the motor or the control unit, the temperature of air inside the electric power steering apparatus rises, the pressure inside the electric power steering apparatus may become higher than that of the outer air; in contrast, when for example, due to stoppage of the electric power steering apparatus, the temperature of air inside the electric power steering apparatus falls, the pressure inside the electric power steering apparatus may become lower than that of the outer air, i.e., a so-called negative pressure may occur. When the pressure change in the inside of the electric power steering apparatus is repeated, the waterproofing member of the electric power steering apparatus is deteriorated; therefore, there exists a probability that due to a pressure difference between the inside of the electric power steering apparatus and the outside thereof, water intrudes into the inside of the electric power steering apparatus.

Patent Document 2 discloses an electric power steering apparatus having a completely waterproof and watertight structure; it is proposed that in order to prevent a pressure change in air inside the electric power steering apparatus from deteriorating a waterproofing member, there is provided a respiratory hole for making the inside and the outside of the electric power steering apparatus communicate with each other, and a filter is inserted into the respiratory hole. The conventional electric power steering apparatus disclosed in Patent Document 2 makes it possible that even when a self-heating member causes the temperature inside the electric power steering apparatus to rise, the air inlet reduces or relaxes the pressure difference between the inside and the outside of the electric power steering apparatus so that water is prevented from intruding into the inside of the electric power steering apparatus.

Each of the conventional electric power steering apparatus disclosed in Patent Document 1 and Patent Document 2 is configured in such a way that as described above, a predetermined waterproof property can be secured; however, when being installed in the vicinity of a rack axel for turning tires of the vehicle, the electric power steering apparatus is exposed to water and dust and may be submerged in the water, in some cases; thus, it is required to take waterproofing measures having a considerable durability. Thus, it is required to secure the waterproof property of the electric power steering apparatus itself in which a motor and a control unit are integrated with each other and to secure the waterproof property of the mounting portion between the electric power steering apparatus and the vehicle.

PRIOR ART REFERENCE

Patent Literature

[Patent Document 1] Japanese Patent Application Laid-Open No. 2009-184492

[Patent Document 2] Japanese Patent Application Laid-Open No. 2005-132165

DISCLOSURE OF THE INVENTION

Problems to be Solved by the Invention

As described above, the conventional electric power steering apparatus disclosed in Patent Document 1 is configured in such a way that by use of a so-called O-ring, as a ring-shaped sealing member, the waterproof property of the space between the motor and the motor-mounting face of the gear housing is secured; however, the output axel of the motor is pivotably supported by use of a bearing whose waterproof property is not secured. Accordingly, by the intermediary of the bearing, a respiratory action is performed between the inside of the electric power steering apparatus and a ventilation path in the outer circumferential surface thereof.

However, because the foregoing ventilation path communicates with the outside by way of the inside of the gear housing provided at the vehicle side and the circumferential surface of the rack axel, a respiratory action, although slightly, is taken through the gear housing; thus, sufficient waterproofing measures have not been taken. Accordingly, because in some cases, water intrudes into the inside of the gear housing, there has been a problem that when the foregoing sealing member is deteriorated or broken, the waterproof property of the electric power steering apparatus cannot be secured.

The conventional electric power steering apparatus disclosed in Patent Document 2 has a respiratory hole for performing a respiratory action; a filter is inserted in the respiratory hole. In general, because having water-repellency, a filter is impervious to water but allows air to pass therethrough. Accordingly, the filter inserted into the air inlet can exert a limited waterproof property on sprinkled water like rain; however, there has been a problem that for example, when the pressure difference between the inside and the outside of the electric power steering apparatus, which is caused by the temperature difference therebetween, becomes large, no sufficient waterproof performance can be secured.

The present disclosure has been implemented in order to solve the foregoing problems in conventional electric power steering apparatuses; the objective thereof is to provide an electric power steering apparatus that secures a sufficient waterproof property and in which a motor and a control unit are integrated with each other.

Means for Solving the Problems

An electric power steering apparatus disclosed in the present application includes a motor for generating auxiliary torque corresponding to steering torque exerted by a driver of a vehicle and a control unit for controlling the motor; the motor and the control unit are integrally coupled with each other, and the motor is mounted in the vehicle through the intermediary of a gear unit. The electric power steering apparatus is characterized in that the motor has a motor housing in which motor constituent members are contained, one axis-direction end portion of which is sealed, and the other axis-direction end portion of which is opened, in that the control unit has a control unit case in which control apparatus constituent members are contained, one axis-direction end portion of which is opened, and the other axis-direction end portion of which is sealed, in that the other axis-direction end portion of the motor housing and the one axis-direction end portion of the control unit case are coupled with each other while maintaining a waterproofing function, In that the one axis-direction end portion of the motor housing and the gear unit are coupled with each other while maintaining a waterproofing function, In that an output axle of the motor extends to the outside of the motor housing while maintaining a waterproofing function, and In that the motor housing has a respiratory apparatus that performs a respiratory action, based on a pressure change in at least one of the motor housing and the control unit.

Advantage of the Invention

In the electric power steering apparatus disclosed in the present application, the motor has a motor housing in which motor constituent members are contained, one axis-direction end portion of which is sealed, and the other axis-direction end portion of which is opened; the control unit has a control unit case in which control apparatus constituent members are contained, one axis-direction end portion of which is opened, and the other axis-direction end portion of which is sealed; the other axis-direction end portion of the motor housing and the one axis-direction end portion of the control unit case are coupled with each other while maintaining a waterproofing function; the one axis-direction end portion of the motor housing and the gear unit are coupled with each other while maintaining a waterproofing function; an output axle of the motor extends to the outside of the motor housing while maintaining a waterproofing function; the motor housing has a respiratory apparatus that performs a respiratory action, based on a pressure change in at least one of the motor housing and the control unit. As a result, it is made possible to maintain a respiratory action and to suppress the waterproof performance from being deteriorated.

Best Mode for Carrying Out the Invention

Embodiment 1

Figure 1:
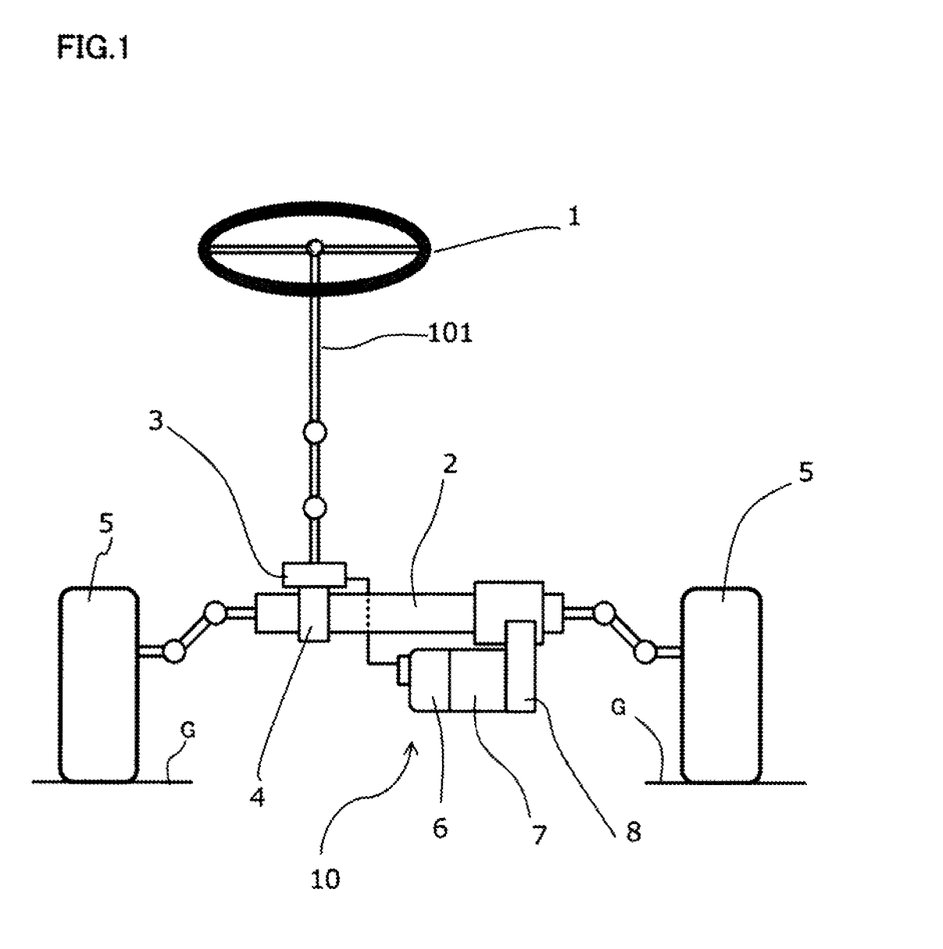
FIG. 1 is a configuration view illustrating a steering system of a vehicle in which an electric power steering apparatus according to Embodiment 1 is mounted.

Hereinafter, an electric power steering apparatus according to Embodiment 1 will be explained in detail with reference to the drawings. FIG. 1 is a configuration view illustrating a steering system of a vehicle in which an electric power steering apparatus according to Embodiment 1 is mounted. In FIG. 1, an electric power steering apparatus 10 according to Embodiment 1 has a motor 7 and a control unit 6 for controlling the motor 7. The motor 7 and the control unit 6 are arranged in the axial direction on one and the same axial line and are integrated with each other in such a way that the respective axis-direction end portions facing each other are coupled with each other. The electric power steering apparatus 10 is mounted to a gear unit 8 in such a way that the direction in which the center axis thereof extends is in parallel with the direction in which the center axis of a rack axel unit 2 extends.

A torque sensor 3, provided in a steering column containing a steering shaft 101, detects steering torque exerted by a driver of a vehicle on the steering shaft 101 through the intermediary of a steering wheel 1, and then inputs the steering torque to the control unit 6 of the electric power steering apparatus 10. Based on the steering torque inputted from the torque sensor 3, the control unit 6 controls the motor 7 so as to make the motor 7 generate auxiliary torque corresponding to the steering torque exerted by the driver.

The gear unit 8 mounted in the rack axel unit 2 has a gear mechanism engaged with a rack axel contained in the rack axel unit 2 of the vehicle and with the output axel 11 of the motor 7, and drives the rack axel unit 2 in the axial direction thereof, based on the auxiliary torque outputted through the output axe of the motor 7, so that steering of vehicle wheels 5 is turned. The steering shaft 101 is coupled with the rack axel unit 2 through the intermediary of a pinion gear 4.

As illustrated in FIG. 1, the torque sensor 3 is mounted at a position farther from the ground G with respect to the rack axel unit 2; the electric power steering apparatus 10 is mounted at a position closer to the ground G with respect to the rack axel unit 2. Because as described above, the electric power steering apparatus is mounted at a position closer to the ground G with respect to the rack axel unit 2, it is indispensable that in comparison with a case where the electric power steering apparatus is mounted above the rack axel unit 2, a waterproof property conforming to a stricter specification is secured.

Figure 2:
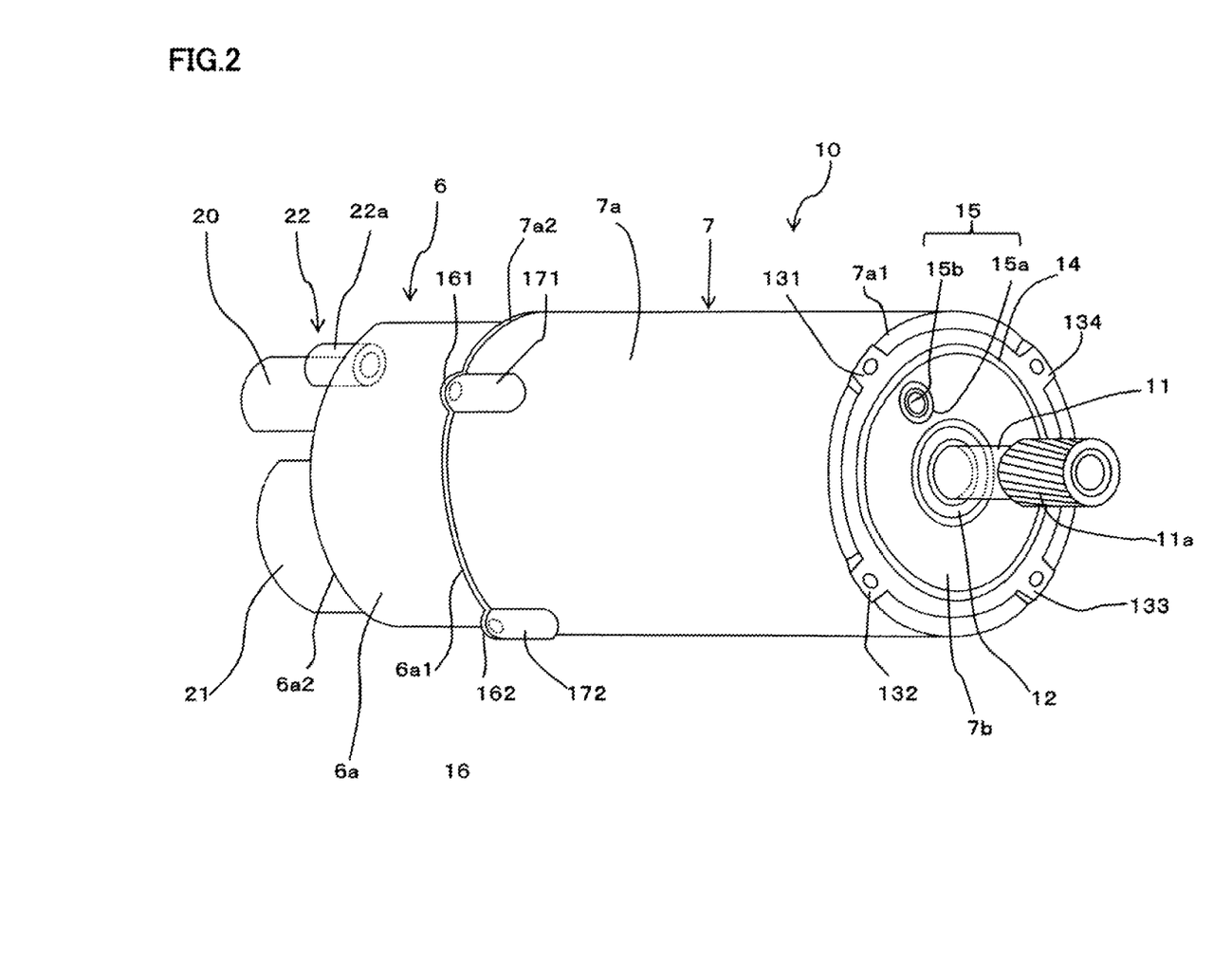
FIG. 2 is a perspective view of the electric power steering apparatus according to Embodiment 1.
Figure 3:
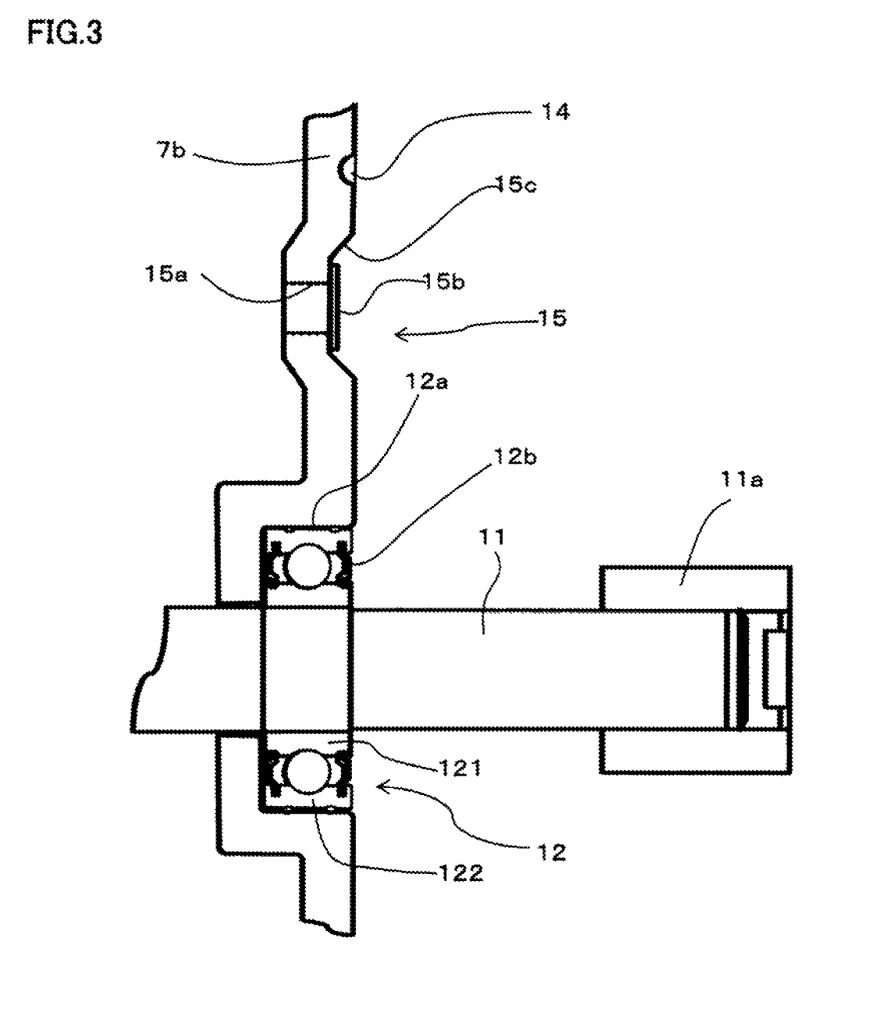
FIG. 3 is a partial cross-sectional view of the electric power steering apparatus according to Embodiment 1.
Figure 4A:
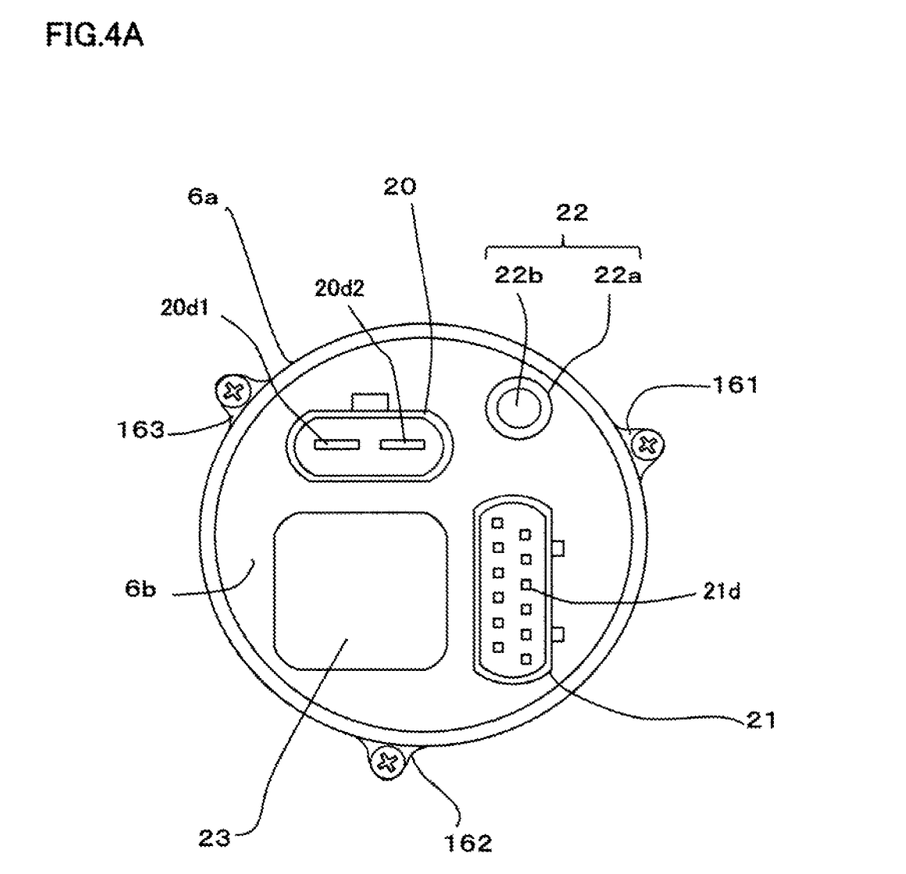
FIG. 4A is a plan view, at a control unit side, of the electric power steering apparatus according to Embodiment 1.
Figure 4B:
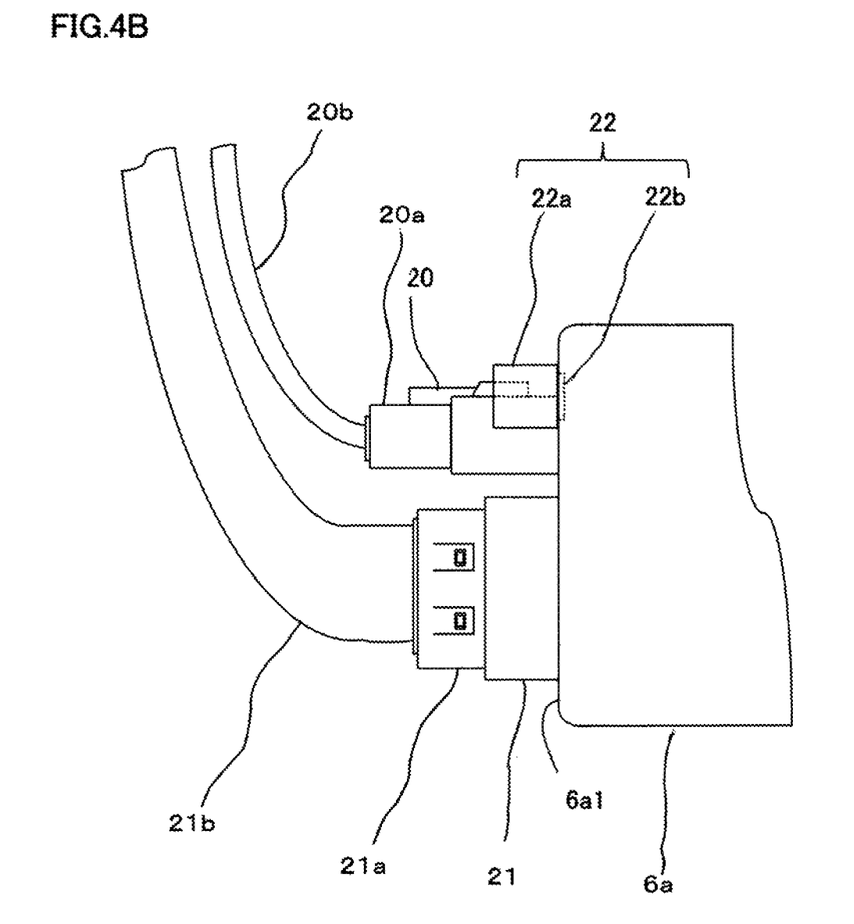
FIG. 4B is a partial side view, at the control unit side, of the electric power steering apparatus according to Embodiment 1.

Next, the electric power steering apparatus according to Embodiment 1 will be explained further in detail. FIG. 2 is a perspective view of the electric power steering apparatus according to Embodiment 1; FIG. 3 is a partial cross-sectional view of the electric power steering apparatus according to Embodiment 1; FIG. 4A is a plan view, at the control unit side, of the electric power steering apparatus according to Embodiment 1; FIG. 4B is a partial side view, at the control unit side, of the electric power steering apparatus according to Embodiment 1. In each of FIGS. 2, 3, 4A, and 4B, the motor 7 has a cylindrical tubular motor housing 7a; motor constituent members such as stator windings and a rotor are incorporated in the motor housing 7a.

The motor housing 7a is formed of metal, for example, aluminum, and is provided with a housing wall portion 7b for sealing one axial-direction end portion 7a1. The other axial-direction end portion 7a2 of the motor housing 7a is opened and coupled with one axial-direction end portion 6a1 of an after-mentioned control unit case 6a in the control unit 6. An output axel 11 of the motor 7 penetrates the central portion of the housing wall portion 7b in the motor housing 7a, through the intermediary of a bearing 12 and extends in the axial direction. An output-axel gear 11a formed in the axis-direction end portion of the output axel 11 is engaged with the foregoing gear mechanism in the gear unit 8. With regard to the motor housing 7a, because as described above, the one axial-direction end portion 7a1 is formed to be bottomed due to the housing wall portion 7b, water intrusion into the motor 7 through the housing wall portion 7b, as a side surface of the motor 7, is completely blocked, except for the bearing 12.

The bearing 12 may be either a bearing having a non-waterproof structure or a bearing having a waterproof structure; in this embodiment, the bearing 12 has a waterproof structure. In other words, with regard to the bearing 12, there exist gaps in two or more positions such as a position between the output axle 11 and a bearing inner ring 121, a position between the bearing inner ring 121 and a bearing outer ring 122, and a position between the bearing outer ring 122 and the housing wall portion 7b; thus, it is required to apply waterproofing measures to all of these gaps.

Accordingly, as illustrated in FIG. 3, an outer-circumference O-ring 12a is inserted between the housing wall portion 7b and the bearing outer ring 122, and a sealing member 12b, which is a metal plate having a rubber material bonded to the outer circumference thereof, is mounted between the bearing inner ring 121 and the bearing outer ring 122. The output axle 11 and the bearing inner ring 121 are made to fit with each other through press-fitting or the like, so that no gap exists between the bearing inner ring 121 and the outer circumferential surface of the output axle 11. Accordingly, in the electric power steering apparatus 10 according to Embodiment 1, no respiratory path is formed in the periphery of the output axle 11, especially through the bearing 12.

The motor housing 7a has four motor fixing portions 131, 132, 133, and 134 formed in such a way as to be spaced evenly apart from one another in the peripheral portion of the one axial-direction end portion 7a1 thereof. A ring-shaped U-shaped groove 14 in the surface of the housing wall portion 7b is formed at the inner diameter side with respect to the motor fixing portions 131, 132, 133, and 134 and at the outer diameter side with respect to the bearing 12. A ring-shaped O-ring (unillustrated) is inserted into the U-shaped groove 14. In addition, the number of the motor fixing portions is not limited to 4; it goes without saying that the number thereof may be 3 or any of other numbers.

The foregoing motor fixing portions 131, 132, 133, and 134 are screwed to the motor mounting portion (unillustrated) of the gear unit 8, so that the electric power steering device 10 is coupled with the gear unit 8. In this situation, because the O-ring inserted into the U-shaped groove 14 in the housing wall portion 7b of the electric power steering device 10 is pressed against the surface of the motor mounting portion of the gear unit 8, the waterproof property in the coupling portion between the electric power steering device 10 and the gear unit 8 is secured.

A first respiratory apparatus 15, as a motor-side respiratory apparatus, is provided in the housing wall portion 7b in such a way as to be between the output axel 11 and the motor fixing portions 131, 132, 133, and 134. The first respiratory apparatus 15 includes a penetration hole portion 15a provided in the bottom surface of a U-shaped portion 15c formed in the outer surface portion of the housing wall portion 7b and a filter 15b that has a water repellency and is mounted inside the U-shaped portion 15c in such a way as to cover the opening portion of the penetration hole portion 15a. The first respiratory apparatus 15 is provided in the space between the bearing 12 and the U-shaped groove 14 in which the O-ring is mounted; however, it is desirable that within the foregoing space, the first respiratory apparatus 15 is disposed at an uppermost position in the radial direction of the housing wall portion 7b. Unlike conventional apparatuses, the electric power steering apparatus 10 according to Embodiment 1 has the first respiratory apparatus 15, as the sole respiratory path in the housing wall portion 7b.

As described above, the first respiratory apparatus 15 is disposed at a position surrounded by the bearing 12 to which waterproofing measures are applied and the O-ring for preventing water from intruding into the electric power steering device 10. The filter 15b makes the electric power steering device 10 secure a respiratory function of allowing air but no water to pass therethrough. In addition, the first respiratory apparatus 15 may be provided at an arbitrary position in the outer circumferential surface of the motor housing 7a, for example, in the vicinity of the vertex portion of the outer circumferential surface of the motor housing 7a. In the case where a pressure difference between the inside and the outside of the motor 7 occurs, the first respiratory apparatus 15 allows only air to pass therethrough; thus, the pressure difference can be eliminated.

Meanwhile, the control unit 6 has a cylindrical tubular control unit case 6a formed of, for example, an insulating resin; control apparatus constituent members such as a circuit network for controlling the motor 7 and the like are contained in the control unit case 6a. The one axial-direction end face 6a1 of the control unit case 6a is opened, and the other axial-direction end portion 6a2 thereof is sealed with a case wall portion 6b. The dimension of the outer diameter of the control unit case 6a is formed to be a value that is the same as the dimension of the outer diameter of the motor housing 7a or a value that is extremely close thereto and is determined as being substantially equal thereto; however, the dimension of the outer diameter of the control unit case 6*a* may be formed to a value other than the foregoing values.

The control unit case 6*a* has three control unit fixing portions 161, 162, and 163 formed in such a way as to be spaced evenly apart from one another in the peripheral portion of the one axial-direction end face 6*a*1 thereof. The control unit fixing portions 161, 162, and 163 are screwed to three control-unit-fixing protrusion portions 171, 172, and another (in FIG. 2, only two thereof are illustrated) provided in the other axial-direction end portion 7*a*2 of the motor housing 7*a*, so that the control unit 6 is coupled with the motor 7. In this situation, a waterproof packing is inserted into or a waterproof sealing compound is applied to the space between the axis-direction end face of the one axial-direction end portion 6*a*1 of the control unit case 6*a* and the axis-direction end face of the other axial-direction end portion 7*a*2 of the motor housing 7*a*, so that the waterproof property of the coupling portion between the control unit 6 and the motor 7 is secured. In addition, each of the number of the control unit fixing portions and the number of the fixing protrusion portions is not limited to 3; it goes without saying that the number thereof may be any of other numbers.

In the case wall portion 6*b*, a power source connector 20, a signal connector 21, an electric component containing portion 23, and a second respiratory apparatus 22 are formed integrally with the control unit case 6*a*. A vehicle-side power source connector 20*a* connected with a power source harness 20*b* is connected with the power source connector 20. A vehicle-side signal connecter 21*a* connected with a signal harness 21*b* for transmitting signals or the like from the torque sensor 3 is connected with the signal connector 21. Large electric components such as a noise filter and a capacitor are contained in the electric component containing portion 23. The power source connector 20, the vehicle-side power source connector 20*a*, the signal connector 21, and the vehicle-side signal connecter 21*a* are formed conforming to respective waterproof specifications.

FIG. 4B illustrates the state where the vehicle-side power source connector 20*a* connected with the power source harness 20*b* is connected with the power source connector 20 and where the vehicle-side signal connecter 21*a* connected with the signal harness 21*b* is connected with the signal connector 21; FIG. 4A illustrates the state where the vehicle-side power source connector 20*a* is not connected with the power source connector 20 and where the vehicle-side signal connecter 21*a* is not connected with the signal connector 21.

The power source connector 20 has two terminals, i.e., a positive-side power source connection terminal 20*d*1 and a negative-side power source connection terminal 20*d*2; the respective cross-sectional areas of these terminals are made large so that a large current for driving the motor 7 can be supplied. A large number of relatively small signal connection terminals 21*d* are arranged in the signal connector 21 so that in addition to information from the torque sensor 3, vehicle-side information such as a vehicle speed is inputted therethrough and a transmission signal from the control unit 6 is outputted therethrough. As illustrated in FIG. 1, the electric power steering apparatus 10 is mounted at a lowest position of the vehicle, and a vehicle battery (unillustrated), a vehicle speed sensor (unillustrated), and the like are provided at positions upper than the position where the electric power steering apparatus 10 is provided; therefore, all of the power source harness 20*b* and the signal harness 21*b* extend toward the upper side of the vehicle.

The second respiratory apparatus 22, as a control-unit-side respiratory apparatus, is provided in the vicinity of the power source connector 20 and the signal connector 21 in the case wall portion 6*b* of the control unit case 6*a*. The second respiratory apparatus 22 has a hollow protrusion portion 22*a* and a filter 22*b* having a water-repellency. The hollow protrusion portion 22*a* protrudes in the axial direction of the control unit 6 from the axis-direction endface portion of the case wall portion 6*b* and makes the respective insides of the control unit case 6*a* and the motor housing 7*a* communicate with the outside of the electric power steering apparatus 10. The filter 22*b* is mounted in such a way as to cover the root portion of the hollow protrusion portion 22*a*, i.e., the opening portion that opens toward the inside of the control unit case 6*a*.

When the motor 7 is driven, the electronic components and large electric components such as the noise filter and the capacitor included in the circuit network and the like contained in the control unit 6 generate heat. When being driven, the motor 7 itself also generates heat. Accordingly, a heat radiation member such as a heat sink is contained in the control unit case 6*a*; the heat generated by the foregoing components is transferred also to the motor constituent members included in the motor 7 through the heat sink or in a direct manner.

At a vehicle-driving time when the electric power steering apparatus 10 is driven, air in the electric power steering apparatus 10 expands due to the foregoing heat generation; in contrast, at a vehicle-drive-stoppage time when the electric power steering apparatus 10 is stopped, the temperature of the electric power steering apparatus 10 decreases and hence the air therein contracts; thus, the pressure inside the electric power steering apparatus 10 becomes a negative pressure. As a result, a respiratory action occurs in the electric power steering apparatus 10. Moreover, in the case where the electric power steering apparatus 10 is mounted at the lowest position of the vehicle, there exists a probability that for example, when the vehicle travels in a road puddle, the whole electric power steering apparatus 10 is submerged in the water.

Because communicating with the respective insides of the control unit case 6*a* and the motor housing 7*a*, the second respiratory apparatus 22 makes it possible that the foregoing respiratory action in the electric power steering apparatus 10 is performed. Moreover, the second respiratory apparatus 22 is provided with the filter 22*b* having a water repellency; thus, even when water intrudes into the hollow protrusion portion 22*a* of the second respiratory apparatus 22, the water can be prevented from intruding into the control unit case 6*a*.

In order to reduce water, dust, and like as much as possible, it is desirable that the respiration opening of the second respiratory apparatus 22 is disposed at an uppermost position in the case wall portion 6*b* of the control unit case 6*a*. When the hollow protrusion portion 22*a* of the second respiratory apparatus 22 is formed to be long in the axis direction, intrusion of water, dust, or the like can further be reduced. In addition, when the second respiratory apparatus 22 is not provided in the case wall portion 6*b* but is disposed in the vicinity of the vertex portion of the cylindrical tubular outer circumferential surface of the control unit case 6*a*, it is made possible to make the second respiratory apparatus 22 situated at a further upper position. In addition, the respiration opening of the second respiratory apparatus may be disposed at a position that is upper in the vertical direction than the respiration opening of the first respiratory apparatus.

In the motor 7, for example, there exist a gap between the stator and the rotor and a gap between the outer circumferential surface of the stator and the inner circumferential surface of the motor housing 7a; in the inside of the control unit 6, a CPU (Central Processing Unit), various kinds of electric lines, an IC (Integrated Circuit), a driving circuit for driving the motor 7, and the like are mounted on a substrate, a relay member, a heat sink, and the like; among the substrate, the relay member, the heat sink, and the control unit case 6a, a great number of spaces exist. Accordingly, the foregoing gaps and spaces inside the electric power steering apparatus 10 function as ventilation paths, in the electric power steering apparatus 10, that communicate with the first respiratory apparatus 15 and the second respiratory apparatus 22.

As described above, because the electric power steering apparatus according to Embodiment 1 is provided with the first respiratory apparatus, as the motor-side respiratory apparatus, and the second respiratory apparatus, as the control-unit-side respiratory apparatus, waterproofing measures are applied to the motor itself and the control unit itself; in addition, although waterproofing measures are applied to the coupling portion between the motor and the control unit, it is made possible to make the electric power steering apparatus maintain the respiratory function thereof. Moreover, in Embodiment 1, each of the first respiratory apparatus and the second respiratory apparatus has a filter having a water repellency; thus, the waterproofing function of the whole electric power steering apparatus can be secured. Moreover, the respective respiratory functions of the first respiratory apparatus and the second respiratory apparatus make it possible that the respective waterproofing functions based on the waterproofing measures applied to the motor itself and the control unit itself and based on the waterproofing measures applied to the coupling portion between the motor and the control unit are prevented from being deteriorated.

In the foregoing explanation, both of the first respiratory apparatus, as the motor-side respiratory apparatus, and the second respirator apparatus, as the control-unit-side respiratory apparatus, are provided; however, because even only any one of the respiratory apparatuses makes it possible to secure the respiratory function, it is allowed that only any one of the respiratory apparatuses is provided.

Because the second respiratory apparatus 22 has a higher probability of being inundated with water than the first respiratory apparatus 15, it is desirable that the second respiratory apparatus 22 is disposed at a position upper than the position of the first respiratory apparatus 15.

Embodiment 2

Next, an electric power steering apparatus according to Embodiment 2 will be explained. The electric power steering apparatus according to Embodiment 2 is characterized by including the first respiratory apparatus, as a motor-side respiratory apparatus, and the second respiratory apparatus, as a control-unit-side respiratory apparatus, and characterized in that the level of the respiratory function of the second respiratory apparatus is made higher than that of the respiratory function of the first respiratory apparatus. The other configurations and operational actions thereof are the same as those of the electric power steering apparatus according to Embodiment 1.

Comparison between the foregoing first respiratory apparatus 15 and the second respiratory apparatus 22 indicates that there exists a large difference between the respective external environments where the foregoing respiratory apparatuses are arranged. That is to say, the ventilation path communicating with the first respiratory apparatus 15 is connected with the outside from the inside of the electric power steering apparatus 10, by way of the gear unit 8 and the rack axel unit 2. In contrast, the ventilation path communicating with the second respiratory apparatus 22 expands from the inside of the electric power steering apparatus 10 toward the outer air; thus, the respiratory resistance and the pressure loss of the second respiratory apparatus 22 is smaller than those of the first respiratory apparatus 15. Accordingly, in comparison with raising the respiratory function of the first respiratory apparatus 15, it is easy to raise the respiratory function of the second respiratory apparatus 22.

Accordingly, in the electric power steering apparatus according to Embodiment 2, there have been taken measures for securely making the respiratory function of the second respiratory apparatus higher than the respiratory function of the first respiratory apparatus. The specific measure for raising the respiratory function of the second respiratory apparatus 22 can be obtained by making the air permeability of the water-repellent filter 22b of the second respiratory apparatus 22 higher than that of the water-repellent filter 15b of the first respiratory apparatus 15, by making the diameter of the water-repellent filter 22b of the second respiratory apparatus 22 larger than that of the water-repellent filter 15b of the first respiratory apparatus 15, by making the diameter of the penetration hole portion of the second respiratory apparatus 22 larger than that of the penetration hole portion of the first respiratory apparatus 15, or by combining some of the above measures.

Because regardless of the level of the respiratory function, the second respiratory apparatus 22 has a higher probability of being inundated with water than the first respiratory apparatus 15, it is desirable that the second respiratory apparatus 22 is disposed at a position upper than the position of the first respiratory apparatus 15.

As described above, the electric power steering apparatus according to Embodiment 2 includes the first respiratory apparatus, as a motor-side respiratory apparatus, and the second respiratory apparatus, as a control-unit-side respiratory apparatus, and the respiratory function of the second respiratory apparatus is made higher than the respiratory function of the first respiratory apparatus; therefore, it is made possible that the respiratory function of the electric power steering apparatus is secured and raised.

Embodiment 3

Figure 5:
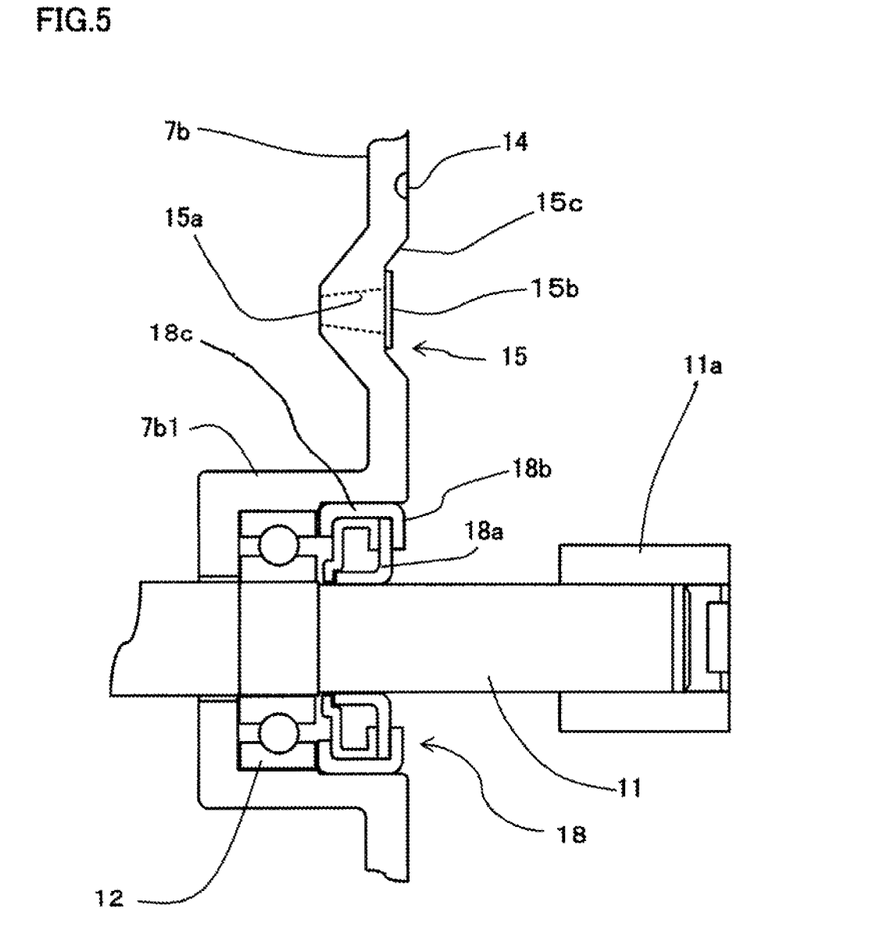
FIG. 5 is a partial cross-sectional view of the electric power steering apparatus according to Embodiment 3.

Next, an electric power steering apparatus according to Embodiment 3 will be explained. FIG. 5 is a partial cross-sectional view of the electric power steering apparatus according to Embodiment 3. In FIG. 5, on the side-surface portion, at the anti-motor side, of the bearing 12 having no waterproof property, an oil seal portion 18 is mounted between the output axle 11 and a bearing mounting portion 7b1 of the housing wall portion 7b. The oil seal 18 includes a seal lip 18a made of, for example, a fluoride resin, an outer circumference metal ring 18b, and an inner circumference metal ring 18c; the outer circumferential portion of the seal lip 18a is pinched by the outer circumference metal ring 18b and the inner circumference metal ring 18c. The inner circumferential surface of the seal lip 18a makes tight contact with and slides on the outer circumferential surface of the output axle 11. The foregoing configuration secures the waterproofing function in the peripheral portion of the bearing 12.

At the radially outside of the bearing 12 and the oil seal 18, the U-shaped portion 15c is provided in the housing wall portion 7b of the motor housing 7a; the penetration hole portion 15a is provided in the central portion of the U-shaped portion 15c. The filter 15b having a water repellency is mounted inside the U-shaped portion 15c in such a way as to cover the opening portion, at the anti-motor side, of the penetration hole portion 15a. Although in comparison with the bearing 12, the axial-direction length of the bearing mounting portion 7b1 in the housing wall portion 7b of the motor housing 7a becomes large, a spatial margin exists in the axial direction (in the left-and-right direction in the drawing) of the first respiratory apparatus 15; therefore, the inner diameter of the opening portion, at the motor side, of the penetration hole portion 15a can be made smaller than the inner diameter of the opening portion with the filter 15b mounted thereto, at the anti-motor side, of the penetration hole portion 15a.

Because being determined by the respective inner diameters of the water-repellent filter 15b and the opening portion, at the anti-motor side, of the penetration hole portion 15a, the respiratory resistance of the first respiratory apparatus 15 does not change even when the inner diameter, at the motor side, of the opening portion is made smaller. Decreasing the inner diameter of the opening portion, at the motor side, of the penetration hole portion 15a makes it possible to prevent foreign materials from intruding into the penetration hole portion 15a, without reducing the respiratory resistance.

As described above, in the electric power steering apparatus according to Embodiment 3, the waterproof property of the peripheral portion of the output axle 11 is secured by the oil seal 18, so that while demonstrating a chimney effect and an effect of preventing intrusion by foreign materials, obtained through the length of the penetration hole portion 15a in the first respiratory apparatus 15, the number of water intrusion paths into the electric power steering apparatus 10 can be decreased without reducing the respiratory resistance and hence the waterproof property can be raised.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

INDUSTRIAL APPLICABILITY

An electric power steering apparatus according to the present application can be applied to the field of a vehicle such as an automobile.

Description of Reference Numerals 1: steering wheel 2: rack axel unit 3: torque sensor 4: pinion gear 5: vehicle wheel 6: control unit 6a: control unit case 6b: case wall portion 7: motor 7a: motor housing 7b: housing wall portion 7b1: bearing mounting portion 8: gear unit 10: electric power steering apparatus 11: output axle 11a: output-axel gear 12: bearing 14: U-shaped groove 15: first respiratory apparatus 15a: penetration hole portion 15c: U-shaped portion 18: oil seal 18a: seal lip 18b: outer circumference metal ring 18c: inner circumference metal ring 15b, 22b: filter 20: power source connecter 20a: vehicle-side power source connector 20b: power source harness 20d1, 20d2: power source connection terminal 21: signal connector 21a: vehicle-side signal connector 21b: signal harness 21d: signal connection terminal 22: second respiratory apparatus 22a: hollow protrusion portion 23: electric component containing portion 101: steering shaft 131, 132, 133, 134: motor fixing portion 161, 162, 163: control unit fixing portion 171, 172: control-unit-fixing protrusion portion

The invention claimed is:

1. An electric power steering apparatus comprising:
   a motor for generating auxiliary torque corresponding to steering torque exerted by a driver of a vehicle; and
   a control unit for controlling the motor,
   wherein the motor and the control unit are integrally coupled with each other and the motor is mounted in the vehicle through the intermediary of a gear unit,
   wherein the motor has a motor housing in which motor constituent members are contained, one axis-direction end portion of which is sealed, and the other axis-direction end portion of which is opened,
   wherein the control unit has a control unit case in which control apparatus constituent members are contained, one axis-direction end portion of which is opened, and the other axis-direction end portion of which is sealed,
   wherein the other axis-direction end portion of the motor housing and the one axis-direction end portion of the control unit case are coupled with each other while maintaining a waterproofing function,
   wherein the one axis-direction end portion of the motor housing and the gear unit are coupled with each other while maintaining a waterproofing function,
   wherein an output axle of the motor extends to the outside of the motor housing while maintaining a waterproofing function, and
   wherein the motor housing has a respiratory apparatus that performs a respiratory action, based on a pressure change in at least one of the motor housing and the control unit, the respiratory apparatus being provided on the one axis-direction end portion of the motor housing.

2. The electric power steering apparatus according to claim 1,
   wherein the motor housing is provided with a bearing that has a waterproofing function and pivotably supports the output axle,
   wherein the motor housing is coupled with the gear unit through the intermediary of an O-ring, and
   wherein the respiratory apparatus is disposed at a position that is between the O-ring and the bearing and is upper in the vertical direction than the output axle.

3. The electric power steering apparatus according to claim 2, wherein the control unit case has a respiratory apparatus that performs a respiratory action, based on a pressure change in at least one of the motor housing and the control unit.

4. The electric power steering apparatus according to claim 3, wherein the respiratory apparatus provided in the control unit case is configured in such a way as to have a higher respiratory function than the respiratory apparatus provided in the motor housing has.

5. The electric power steering apparatus according to claim 3, wherein the respiratory apparatus provided in the control unit case includes a penetration hole provided in the control unit case and a water-repellent filter that covers an opening portion of the penetration hole, wherein the respiratory apparatus provided in the motor housing includes a penetration hole provided in the motor housing and a water-repellent filter that covers an opening portion of the penetration hole.

6. The electric power steering apparatus according to claim 3, wherein the electric power steering apparatus is disposed at a lower position than a rack axle of the vehicle is.

7. The electric power steering apparatus according to claim 2, wherein the respiratory apparatus provided in the control unit case is configured in such a way as to have a higher respiratory function than the respiratory apparatus provided in the motor housing has.

8. The electric power steering apparatus according to claim 2, further comprising an oil seal that makes contact with the side surface, at the anti-motor side, of the bearing.

9. The electric power steering apparatus according to claim 8, wherein the electric power steering apparatus is disposed at a lower position than a rack axle of the vehicle is.

10. The electric power steering apparatus according to claim 2, wherein the bearing has a bearing outer ring and a bearing inner ring, wherein an O-ring is inserted between the motor housing and the bearing outer ring, and wherein a sealing member is mounted between the bearing inner ring and the bearing outer ring.

11. The electric power steering apparatus according to claim 10, wherein the electric power steering apparatus is disposed at a lower position than a rack axle of the vehicle is.

12. The electric power steering apparatus according to claim 2, wherein the electric power steering apparatus is disposed at a lower position than a rack axle of the vehicle is.

13. The electric power steering apparatus according to claim 1, wherein the control unit case has a respiratory apparatus that performs a respiratory action, based on a pressure change in at least one of the motor housing and the control unit.

14. The electric power steering apparatus according to claim 13, wherein the respiratory apparatus provided in the control unit case is configured in such a way as to have a higher respiratory function than the respiratory apparatus provided in the motor housing has.

15. The electric power steering apparatus according to claim 13, wherein the respiratory apparatus provided in the control unit case includes a penetration hole provided in the control unit case and a water-repellent filter that covers an opening portion of the penetration hole, and wherein the respiratory apparatus provided in the motor housing includes a penetration hole provided in the motor housing and a water-repellent filter that covers an opening portion of the penetration hole.

16. The electric power steering apparatus according to claim 15, wherein the electric power steering apparatus is disposed at a lower position than a rack axle of the vehicle is.

17. The electric power steering apparatus according to claim 13, wherein the electric power steering apparatus is disposed at a lower position than a rack axle of the vehicle is.

18. The electric power steering apparatus according to claim 1, wherein the respiratory apparatus provided in the control unit case is configured in such a way as to have a higher respiratory function than the respiratory apparatus provided in the motor housing has.

19. The electric power steering apparatus according to claim 18, wherein the electric power steering apparatus is disposed at a lower position than a rack axle of the vehicle is.

20. The electric power steering apparatus according to claim 1, wherein the electric power steering apparatus is disposed at a lower position than a rack axle of the vehicle is.

* * * * *